United States Patent
Yang et al.

(10) Patent No.: US 10,361,568 B2
(45) Date of Patent: Jul. 23, 2019

(54) ENERGY BALANCING METHOD AND APPARATUS

(71) Applicant: HUAWEI TECHNOLOGIES CO., LTD., Shenzhen (CN)

(72) Inventors: Rui Yang, Shanghai (CN); Xiaokang Liu, Shanghai (CN); Zhiwei Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/858,210

(22) Filed: Dec. 29, 2017

(65) Prior Publication Data

US 2018/0123356 A1 May 3, 2018

Related U.S. Application Data

(63) Continuation of application No. PCT/CN2016/084338, filed on Jun. 1, 2016.

(30) Foreign Application Priority Data

Jun. 30, 2015 (CN) .......................... 2015 1 0372914

(51) Int. Cl.
*H02J 7/00* (2006.01)
*H01M 10/44* (2006.01)
(Continued)

(52) U.S. Cl.
CPC ............ *H02J 7/0014* (2013.01); *B60L 58/22* (2019.02); *H01M 10/441* (2013.01);
(Continued)

(58) Field of Classification Search
CPC ....... H02J 7/0014; H02J 7/0018; H02J 7/0019
(Continued)

(56) References Cited

U.S. PATENT DOCUMENTS

| 5,659,237 A | 8/1997 | Divan et al. |
| 2003/0214366 A1 | 11/2003 | Robison et al. |

(Continued)

FOREIGN PATENT DOCUMENTS

| CN | 102185359 A | 9/2011 |
| CN | 102427255 A | 4/2012 |

(Continued)

OTHER PUBLICATIONS

International Search Report and Written Opinion (including English translation) issued in corresponding International Application No. PCT/CN2016/084338, dated Aug. 24, 2016, 21 pages.

(Continued)

*Primary Examiner* — Edward Tso
*Assistant Examiner* — Aaron Piggush
(74) *Attorney, Agent, or Firm* — Conley Rose, P.C.

(57) ABSTRACT

An energy balancing apparatus and method, and a terminal are provided in the battery field. The apparatus may include a controlled alternating current energy supply, an alternating current energy distribution circuit, filter circuits, rectifier circuits, and a balance control circuit. The controlled alternating current energy supply and an input port of the alternating current energy distribution circuit are connected in parallel, each output port of the alternating current energy distribution circuit and an input side of a corresponding filter circuit are connected in parallel, an output side of each filter circuit and an alternating current side of a corresponding rectifier circuit are connected in parallel, a direct current side of each rectifier circuit and a corresponding battery cell are connected in parallel, each battery cell is connected to the balance control circuit, and the balance control circuit is connected to the controlled alternating current energy supply.

14 Claims, 8 Drawing Sheets

(51) Int. Cl.
*H02J 7/02* (2016.01)
*B60L 58/22* (2019.01)
*H01M 2/10* (2006.01)
*H01M 10/42* (2006.01)

(52) U.S. Cl.
CPC ............ *H02J 7/0019* (2013.01); *H02J 7/022* (2013.01); *H01M 2/1016* (2013.01); *H01M 2010/4271* (2013.01); *H02J 2007/005* (2013.01); *H02J 2007/0095* (2013.01); *Y02T 10/7055* (2013.01)

(58) Field of Classification Search
USPC .......................... 320/108, 116, 119, 158, 164
See application file for complete search history.

(56) References Cited

U.S. PATENT DOCUMENTS

| | | |
|---|---|---|
| 2011/0084668 A1 | 4/2011 | Nakao |
| 2011/0140663 A1 | 6/2011 | Tofigh et al. |
| 2015/0002083 A1* | 1/2015 | Nakao .................. H01M 10/44 320/107 |
| 2015/0357843 A1* | 12/2015 | Kobayashi ............ H02J 7/0016 320/118 |

FOREIGN PATENT DOCUMENTS

| | | |
|---|---|---|
| CN | 102593882 A | 7/2012 |
| CN | 202475036 U | 10/2012 |
| CN | 103607027 A | 2/2014 |
| CN | 104242381 A | 12/2014 |
| JP | 2013207906 A | 10/2013 |
| WO | 2014115200 A1 | 7/2014 |

OTHER PUBLICATIONS

Foreign Communication From A Counterpart Application, European Application No. 16817103.1, Extended European Search Report dated Feb. 21, 2018, 11 pages.

Machine Translation and Abstract of International Publication No. WO2014115200, Jul. 31, 2014, 30 pages.

Foreign Communication From A Counterpart Application, European Application No. 16817103.1, European Communication dated Nov. 19, 2018, 1 page.

* cited by examiner

ENERGY BALANCING METHOD AND APPARATUS

CROSS-REFERENCE TO RELATED APPLICATIONS

This application is a continuation of International Application No. PCT/CN2016/084338, filed on Jun. 1, 2016, which claims priority to Chinese Patent Application No. 201510372914.5, filed on Jun. 30, 2015. The disclosures of the aforementioned applications are hereby incorporated by reference in their entireties.

TECHNICAL FIELD

The present disclosure relates to the battery field, and more specifically, to a battery pack energy balancing method and apparatus.

BACKGROUND

To meet an output voltage or output power requirement, multiple rechargeable battery cells are generally connected in series to form a battery pack. The multiple battery cells in the battery pack should have a same energy level in an ideal situation. On one hand, for a battery cell produced in practice, a self-discharge phenomenon exists when the battery cell is not used, causing stored energy leakage in the battery cell. On the other hand, due to aging materials, an energy storage capacity of the rechargeable battery cell decreases during reuse. Degrees of stored energy leakage and degrees of energy storage capacity decrease of different battery cells are related to internal resistances of the battery cells, an ambient temperature difference, and inconsistency occurring in a production process. For the multiple battery cells connected in series, even if normal energy consumptions caused by working currents are the same, energy levels of the battery cells in the battery pack are different because of stored energy leakage and energy storage capacity decrease.

The rechargeable battery cell needs to operate in a proper energy level interval, and an excessively low or an excessively high energy level may cause damage to the battery cell. For example, when the battery pack is discharged, a battery cell with a lowest energy level reaches a lower limit of an energy interval first, leading to end of normal discharge of the battery pack. When the battery pack is charged, a battery cell with a highest energy level reaches an upper limit of the energy interval first, leading to end of normal charge of the battery pack. Therefore, when energy levels of the multiple battery cells in the battery pack are different, if no corresponding energy balancing measure is taken, the battery pack as a whole cannot be fully charged during energy charge and cannot be fully discharged during energy discharge. Consequently, an actual capacity available for the battery pack is reduced. To make the most of energy stored in each battery cell in the battery pack, it is necessary to perform energy balancing on the multiple battery cells connected in series.

A purpose of energy balancing is to ensure a consistent energy level for the battery cells connected in series in the battery pack. A current energy balancing method is active balancing. That is, energy of a battery cell with a high energy level is transferred to a battery cell with a low energy level, so that an energy level of each battery cell approaches an average value in the battery pack. Alternatively, from an energy supply outside the battery pack is supplemented to a battery cell with a relatively low energy level in the battery pack, so that an energy level of each battery cell approaches a highest value in the battery pack.

In the prior art, energy balancing solutions implemented according to the active balancing idea include a balancing circuit based on a Buck-Boost converter, a balancing circuit based on multiple full-bridge converters, and the like. As shown in FIG. 1, FIG. 1 shows a balancing circuit based on a Buck-Boost converter. There are N battery cells in FIG. 1, which are B1, B2, . . . , BN, respectively. To implement energy balancing, a full-control switch component needs to be configured for each battery cell. In this case, 2N–2 full-control switch components need to be configured for the N battery cells, where N is not less than 2. As shown in FIG. 2, FIG. 2 shows a balancing circuit based on multiple full-bridge converters. There are N battery cells in FIG. 2. However, 4N full-control switch components are required to control energy flow, so as to implement energy balancing.

It can be learned from FIG. 1 and FIG. 2 that, although the foregoing solutions can implement energy balancing, there is a relatively large quantity of full-control switch components (sw shown in FIG. 1 and FIG. 2 represents a full-control switch component) in the foregoing solutions, a drive system is complex, and costs are relatively high.

SUMMARY

Embodiments of the present disclosure provide an energy balancing method and apparatus. The apparatus uses other components instead of full-control switch components to control energy flow, to achieve energy balancing. The apparatus is characterized by a simple drive system, low costs, and high reliability.

A first aspect of the embodiments of the present disclosure discloses an energy balancing apparatus, where the apparatus includes a controlled alternating current energy supply, an alternating current energy distribution circuit, filter circuits, rectifier circuits, and a balance control circuit, where the alternating current energy distribution circuit includes N output ports and at least one input port, N is an integer not less than 2, a quantity of the filter circuits is N, frequency intervals corresponding to any two filter circuits do not overlap, a quantity of the rectifier circuits is N, the output ports of the alternating current energy distribution circuit correspond one-to-one to the filter circuits, the filter circuits correspond one-to-one to the rectifier circuits, and the rectifier circuits correspond one-to-one to battery cells; and the controlled alternating current energy supply and the input port of the alternating current energy distribution circuit are connected in parallel, the controlled alternating current energy supply is connected to the balance control circuit, and the controlled alternating current energy supply is configured to output, according to a frequency instruction signal sent by the balance control circuit, an alternating current voltage corresponding to the frequency instruction signal;

each output port of the alternating current energy distribution circuit and an input side of a corresponding filter circuit are connected in parallel, and the alternating current energy distribution circuit is configured to distribute, to each output port, alternating current energy transferred from the controlled alternating current energy supply;

an output side of each filter circuit of the N filter circuits and an alternating current side of a corresponding rectifier circuit are connected in parallel, and each filter circuit is configured to allow alternating current energy whose frequency is in a preset frequency interval to pass; and two ends of a direct current side of each rectifier circuit of the N rectifier circuits and two ends of a corresponding battery cell are connected in parallel, and the rectifier circuit is configured to convert, into direct current energy, the alternating current energy transferred from the filter circuit, and transfer the direct current energy to the battery cell.

A second aspect of the embodiments of the present disclosure discloses a terminal, where the terminal includes battery cells and the foregoing energy balancing apparatus according to the first aspect that is connected to the battery cells.

A third aspect of the embodiments of the present disclosure discloses an energy balancing method, where the method includes:

obtaining a status parameter of each battery cell in a battery pack;

determining, according to the status parameter of each battery cell, a battery cell that requires an energy supplement;

determining a frequency interval of a filter circuit corresponding to the battery cell that requires an energy supplement, where each battery cell in the battery pack has a corresponding filter circuit, and frequency intervals corresponding to any two filter circuits do not overlap; and outputting an alternating current voltage whose frequency is in the frequency interval, so that the battery cell that requires an energy supplement is charged.

It can be learned from the above that, the battery cell energy balancing apparatus provided by the embodiments of the present disclosure can implement energy balancing for a battery cell by using a filter to control energy flow, thereby simplifying a drive system while reducing hardware costs.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

When multiple rechargeable battery cells connected in series are reused, due to individual differences generated during production and different aging and decrease degrees, energy imbalance may occur in the battery cells. Active balancing is a method for balancing energy of battery cells in a battery pack, and the method can enable energy levels of all battery cells connected in series to be approximately consistent. Common active balancing methods include a balancing circuit based on a Buck-Boost converter, a balancing circuit based on multiple full-bridge converters, and the like. A full-control switch component is used to control energy flow in the foregoing balancing circuits, to achieve energy balancing. As a result, the foregoing balancing circuits all have many full-control switch components, leading to a complex drive system and relatively high hardware costs of the foregoing balancing circuits.

An embodiment of the present disclosure provides a battery cell energy balancing apparatus with low hardware costs, a simple drive system, and good energy balancing selectivity. The apparatus is applicable to both voltage-based balance determining and balance determining based on SOC (State Of Charge).

An example of the present disclosure is as follows: A conductive path for supplementing energy is established for each battery cell in a battery pack, and frequency pass intervals that are allowed by any two different conductive paths do not overlap. A balance control circuit selects, according to a current energy status of each battery cell in the battery pack, a battery cell that requires an energy supplement, and adjusts an output frequency of an alternating current energy supply, so that energy passes through a conductive path in which the battery that requires an energy supplement is located. This process is repeated so that energy levels of battery cells in the battery pack are approximately consistent, so as to implement energy balancing.

Figure 1:
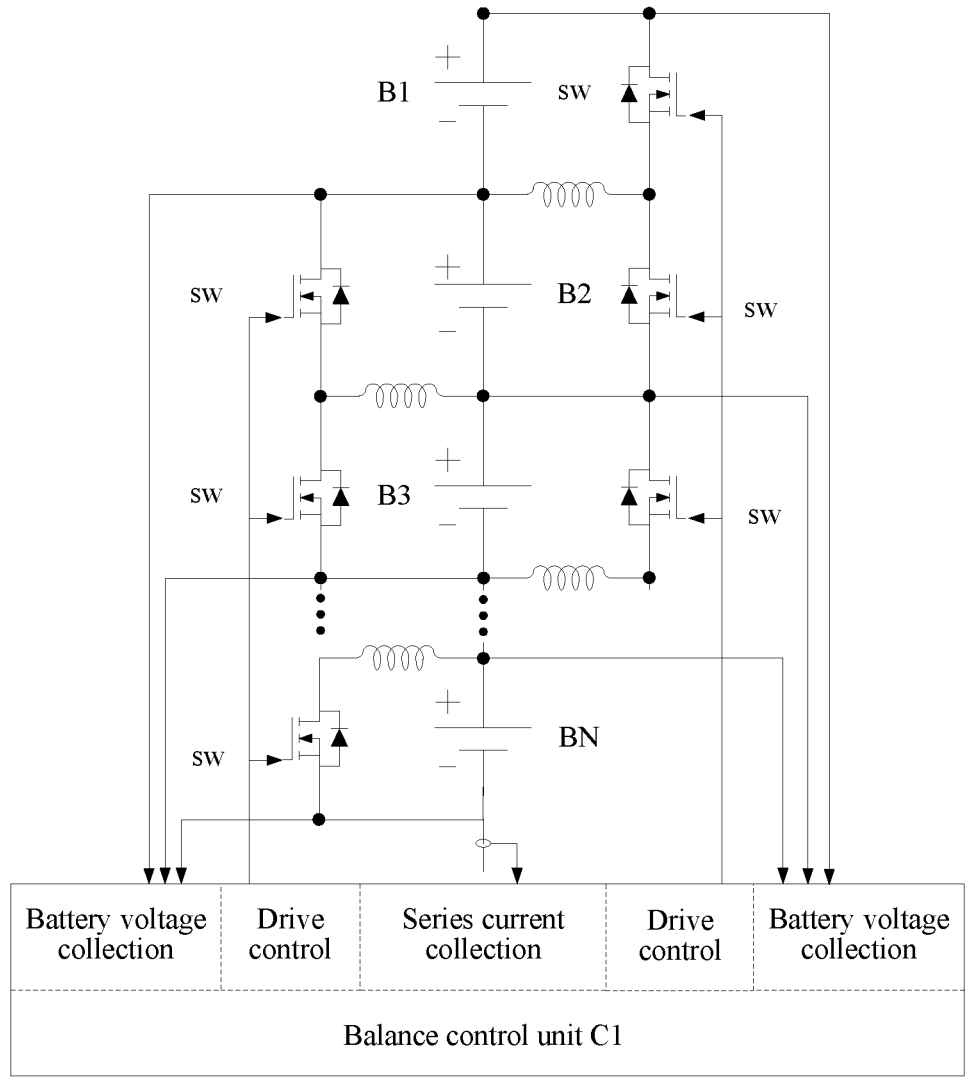
FIG. 1 is a schematic diagram of a balancing circuit based on a Buck-Boost converter.
Figure 2:
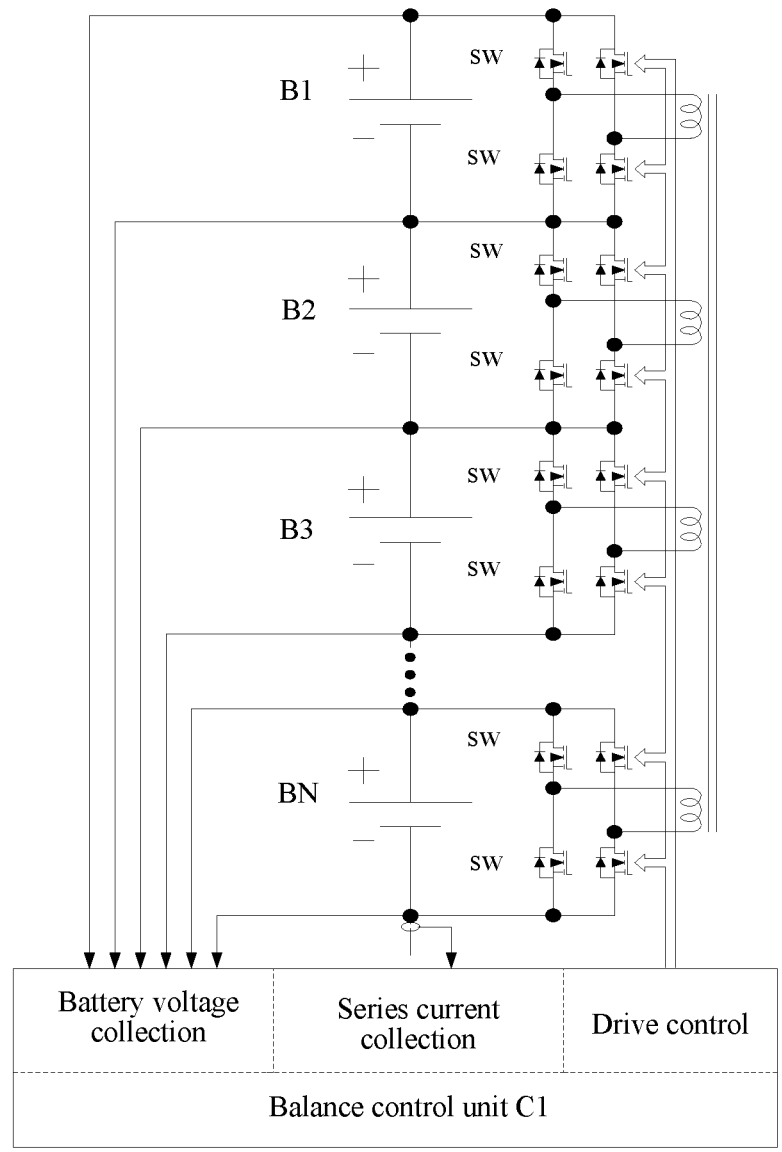
FIG. 2 is a schematic diagram of a balancing circuit based on multiple full-bridge converters.
Figure 3:
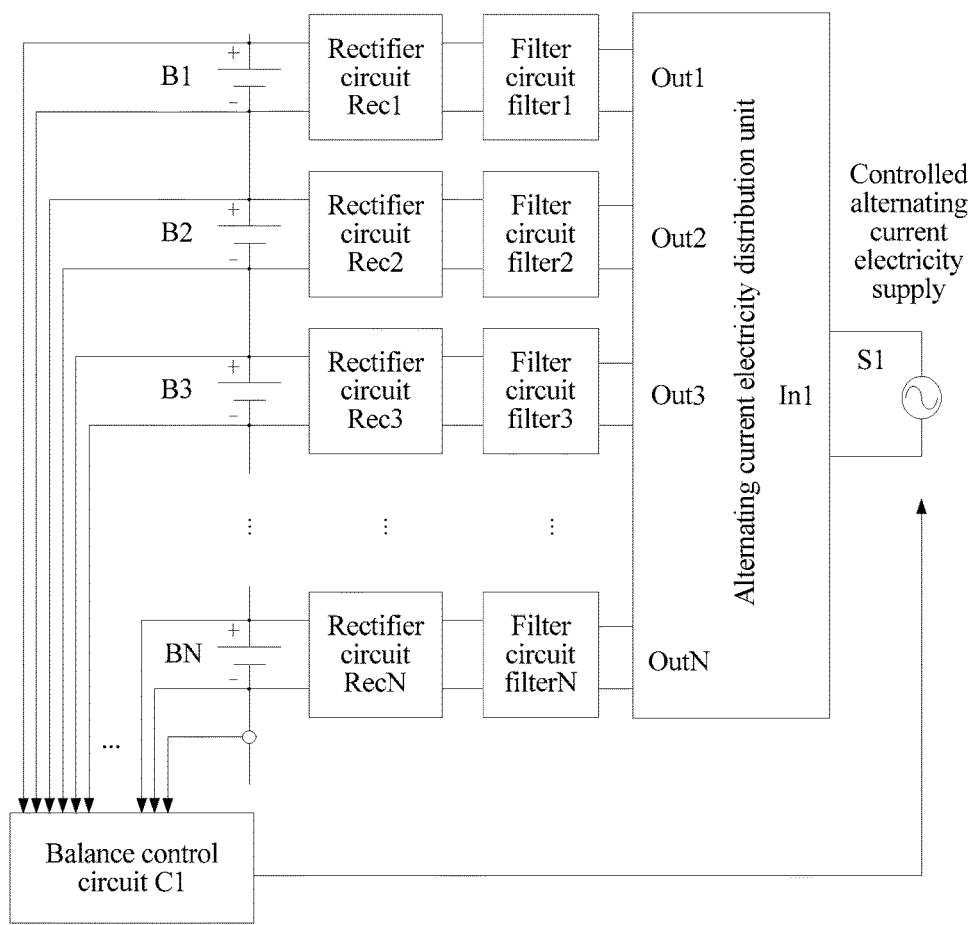
FIG. 3 is a schematic diagram of a battery cell energy balancing apparatus according to an aspect of the present disclosure.

FIG. 3 is a schematic diagram of a battery cell energy balancing apparatus provided by an aspect of the present disclosure. The battery cell energy balancing apparatus includes a controlled alternating current energy supply S1, an alternating current energy distribution circuit, filter circuits, rectifier circuits, and a balance control circuit.

The alternating current energy distribution circuit includes N output ports and at least one input port In1, and N is an integer not less than 2.

A quantity of the filter circuits is N. Frequency intervals corresponding to any two filter circuits do not overlap. The output ports of the alternating current energy distribution circuit correspond one-to-one to the filter circuits.

A quantity of the rectifier circuits is N. The filter circuits correspond one-to-one to the rectifier circuits. The rectifier circuits correspond one-to-one to battery cells.

The controlled alternating current energy supply S1 and the input port In1 of the alternating current energy distribution circuit are connected in parallel. The controlled alternating current energy supply S1 is connected to the balance control circuit. The controlled alternating current energy supply is configured to output, according to a frequency instruction signal sent by the balance control circuit, an alternating current voltage corresponding to the frequency instruction signal.

Each output port of the alternating current energy distribution circuit and an input side of a corresponding filter circuit are connected in parallel. The alternating current energy distribution circuit is configured to distribute, to each output port, alternating current energy transferred from the controlled alternating current energy supply.

An output side of each filter circuit of the N filter circuits and an alternating current side of a corresponding rectifier circuit are connected in parallel. Each filter circuit is configured to allow alternating current energy whose frequency is in a preset frequency interval to pass.

A direct current side of each rectifier circuit in the N rectifier circuits and a corresponding battery cell are connected in parallel. The rectifier circuit is configured to convert, into direct current energy, the alternating current energy transferred from the filter circuit, and send the direct current energy to the battery cell.

Each battery cell is connected to the balance control circuit. The balance control circuit is configured to determine, according to a status parameter of each battery cell, a battery cell that requires an energy supplement, determine a frequency interval of a filter circuit corresponding to the battery cell that requires an energy supplement, and send a frequency instruction signal to the controlled alternating current energy supply, so that the controlled alternating current energy supply outputs an alternating current voltage whose frequency is in the frequency interval.

It can be learned from the above that, the battery cell energy balancing apparatus provided by the present disclosure can implement energy balancing by using a filter to control an energy supplement of a battery cell, thereby simplifying a drive system while reducing hardware costs.

Additionally or alternatively, in the present disclosure, a filter is used to control an energy supplement of a battery cell, thereby avoiding low reliability of an apparatus caused by excessive full-control switch components in the apparatus, reducing complexity of drive signal cabling on a control side, and facilitating reliability improvement.

Additionally or alternatively, all battery cells are connected to respective conductive paths through which alternating current energy in a specific frequency interval is allowed to pass, so that an output frequency of the alternating current energy supply is adjusted to implement energy reception of one or more battery cells, thereby enhancing a selection capability of battery cell energy balancing.

Additionally or alternatively, when multiple battery cells are balanced at the same time, amplitudes of fundamental wave voltages corresponding to frequencies in output modulation alternating current voltages may be adjusted separately to adjust amounts of energy received by different battery cells, so as to implement decoupling of energy balancing adjustments for the different battery cells.

Additionally or alternatively, the balance control circuit is allowed to select, according to a voltage magnitude or a SOC magnitude, a battery cell that requires an energy supplement.

Based on the foregoing embodiment, in another aspect of the present disclosure, the controlled alternating current energy supply S1 includes an inverter structure and an inverter control structure. The inverter control structure is configured to receive the frequency instruction signal sent by the balance control circuit, and instruct the inverter structure to output an alternating current voltage whose frequency is corresponding to the frequency instruction signal.

For example, the controlled alternating current energy supply S1 may be implemented by using a full-bridge inverter structure and a full-bridge inverter control circuit, or a half-bridge inverter structure and a half-bridge inverter control circuit, or a single-phase tri-level inverter structure and a single-phase tri-level inverter control circuit, or a power amplifier and a power amplifier control circuit. The controlled alternating current energy supply S1 may be implemented in many manners, which are not enumerated herein.

Based on the foregoing embodiment, in another aspect of the present disclosure, the alternating current energy distribution circuit includes at least one input port In1 and N output ports, and the N output ports are numbered Out1 to OutN. Two ends of the input port In1 and two ends of the controlled alternating current energy supply S1 are connected in parallel. Two ends of each of the output ports Out1 to OutN and two ends on an input side of each of the filter circuit 1 to the filter circuit N are connected in parallel respectively. For example, the two ends of Out1 and the two ends on the input side of the filter circuit 1 are connected in parallel; the two ends of Out2 and the two ends on the input side of the filter circuit 2 are connected in parallel; the two ends of OutN and the two ends on the input side of the filter circuit N are connected in parallel, so that the output ports of the alternating current energy distribution circuit correspond one-to-one to the filter circuits.

In another aspect of the present disclosure, the alternating current energy distribution circuit is configured to distribute alternating current energy on an input side to the output ports, and the output ports Out1 to OutN are electrically isolated from each other. The alternating current energy distribution circuit may be implemented by using one multi-winding transformer or multiple transformers that are connected in parallel on a primary side and are independent of each other on a secondary side. The alternating current energy distribution circuit may further be multiple coils.

When the apparatus includes multiple controlled alternating current supplies, the multiple controlled alternating current supplies may be connected to a same alternating current energy distribution circuit or connected to different alternating current energy distribution circuits respectively.

Additionally or alternatively, based on the foregoing embodiment, in another aspect of the present disclosure, two ends on the input side of the filter circuit and two ends of the output port of the alternating current energy distribution circuit are respectively connected in parallel, and two ends on the output side of the filter circuit and two ends on the alternating current side of the rectifier circuit are respectively connected in parallel. A function of the filter circuits is to allow alternating current energy in a specific frequency interval to pass. For example, any filter circuit has a frequency interval, and alternating current energy whose frequency is in the interval can pass the filter circuit. In addition, frequency intervals corresponding to any two filter circuits do not overlap. The filter circuit may be an active filter circuit or a passive filter circuit. For example, the filter circuit includes at least one inductor circuit and at least one capacitor circuit, and the inductor circuit and the capacitor circuit are connected in series or in parallel. For example, the filter circuit includes at least one inductor circuit, at least one capacitor circuit, and at least one resistor circuit, and the inductor circuit, the capacitor circuit, and the resistor circuit are connected in series or in parallel.

Additionally or alternatively, based on the foregoing embodiment, in another aspect of the present disclosure, two ends on an alternating current side of the rectifier circuit and two ends of an output side of the filter circuit are connected in parallel, and two ends on a direct current side of the rectifier circuit and two ends of a battery cell are connected in parallel. The rectifier circuit may be a full-bridge rectifier structure or a full-wave rectifier structure. For example, the rectifier circuit may be implemented by using an uncontrolled full-bridge rectifier circuit, an uncontrolled full-wave rectifier circuit, or a controlled full-bridge rectifier circuit. Some components in the filter circuit may be obtained by reusing components in the alternating current energy distribution circuit or the rectifier circuit. For example, an inductor component in the filter circuit may be obtained by using a parasitic inductor in the alternating current energy distribution circuit, and a capacitor component in the filter circuit may also be obtained by using a parasitic capacitor in the rectifier circuit.

Additionally or alternatively, based on the foregoing embodiment, in another aspect of the present disclosure, the balance control circuit has a capability of detecting and calculating an energy level of a battery cell, and outputting a frequency instruction signal.

Figure 4:
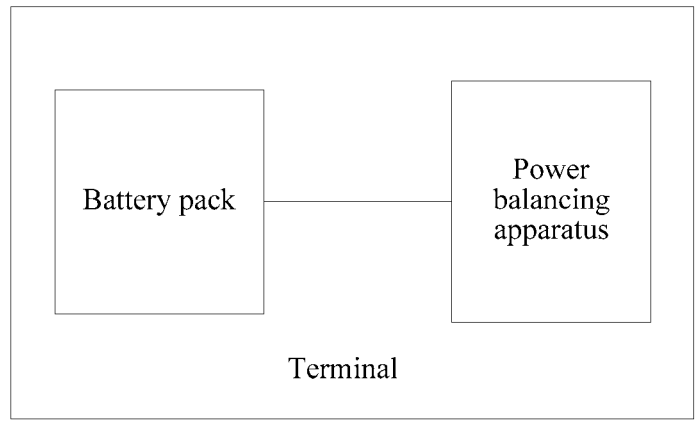
FIG. 4 is a schematic structural diagram of a terminal according to an aspect of the present disclosure.

As shown in FIG. 4, FIG. 4 is a schematic structural diagram of a terminal provided by an aspect of the present disclosure. The terminal includes battery cells and an energy balancing apparatus connected to the battery cells. The energy balancing apparatus is the battery cell energy balancing apparatus provided by the foregoing embodiment.

The terminal provides energy by using the battery cells. A common terminal of this type may be a device, such as a mobile phone, a tablet computer, an electric automobile, or an electric bicycle.

Figure 5:
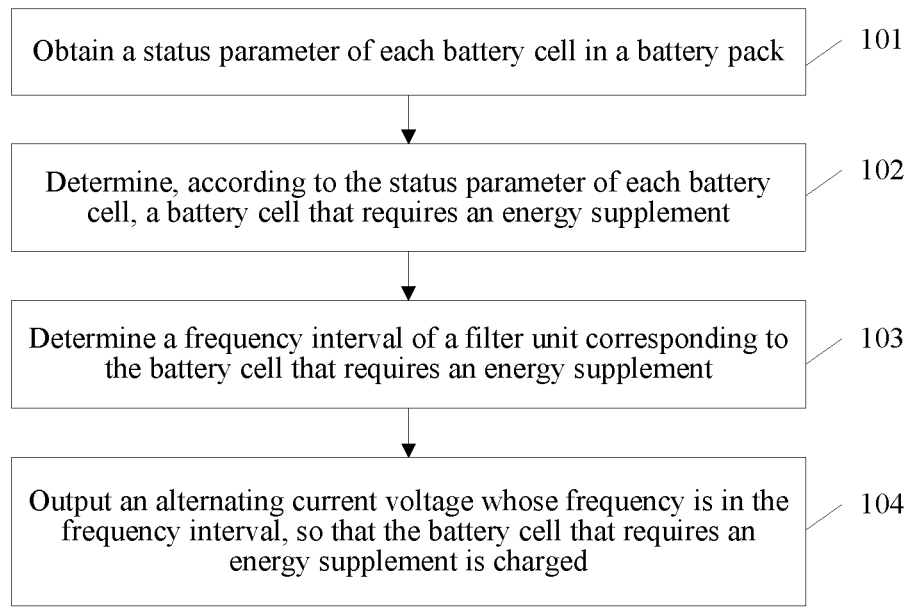
FIG. 5 shows a schematic flowchart of an energy balancing method according to an aspect of the present disclosure.

As shown in FIG. 5, FIG. 5 shows an energy balancing method provided by an aspect of the present disclosure. The method includes the following four steps.

101. Obtain a status parameter of each battery cell in a battery pack.

The status parameter may be a voltage, a current, or a SOC obtained by calculation.

102. Determine, according to the status parameter of each battery cell, a battery cell that requires an energy supplement.

103. Determine a frequency interval of a filter circuit corresponding to the battery cell that requires an energy supplement, where each battery cell in the battery pack corresponds to one filter circuit, and frequency intervals corresponding to any two filter circuits do not overlap.

104. Output an alternating current voltage whose frequency is in the frequency interval, so that the battery cell that requires an energy supplement is charged.

It can be learned from the above that, in the energy balancing method provided by the present disclosure, after the frequency interval of the filter circuit corresponding to the battery cell that requires an energy supplement is determined, the alternating current voltage whose frequency is in the frequency interval is output, so that the battery cell that requires an energy supplement is charged, thereby achieving an energy balancing effect.

Additionally or alternatively, based on the foregoing embodiment, in another aspect of the present disclosure, the determining, according to the status parameter of each battery cell, a battery cell that requires an energy supplement includes:
  determining an energy level of each battery cell according to the status parameter of each battery cell; and
  determining a battery cell whose energy level is less than a first threshold as the battery cell that requires an energy supplement.

Additionally or alternatively, based on the foregoing embodiment, in another aspect of the present disclosure, after the alternating current voltage whose frequency is in the frequency interval is output, the method further includes:
  detecting an energy level of the battery cell that requires an energy supplement; and
  when the energy level of the battery cell that requires an energy supplement is greater than a second threshold, stopping supplementing energy, where the second threshold is greater than the first threshold.

Additionally or alternatively, based on the foregoing embodiment, in another aspect of the present disclosure, the determining, according to the status parameter of each battery cell, a battery cell that requires an energy supplement includes:
  determining an energy level of each battery cell according to the status parameter of each battery cell;
  obtaining an energy level difference between any two battery cells; and
  when an absolute value of the energy level difference is greater than a third threshold, determining a battery cell with a lower energy level in the any two battery cells as the battery cell that requires an energy supplement.

Additionally or alternatively, based on the foregoing embodiment, in another aspect of the present disclosure, after the alternating current voltage whose frequency is in the frequency interval is output, the method further includes:
  obtaining an energy level of the battery cell that requires an energy supplement; and
  when a difference between the energy level of the battery cell that requires an energy supplement and an energy level of a normal battery cell is less than or equal to a fourth threshold, stopping supplementing energy, where the normal battery cell is a battery cell that does not require an energy supplement, and the fourth threshold is less than the third threshold.

Additionally or alternatively, based on the foregoing embodiment, in another aspect of the present disclosure, the outputting an alternating current voltage whose frequency is in the frequency interval includes:
  outputting a frequency instruction signal to a controlled alternating current energy supply, so that the controlled alternating current energy supply outputs an alternating current voltage corresponding to the frequency instruction signal, where the frequency instruction signal is in a frequency interval corresponding to a conductive path in which the battery that requires an energy supplement is located, and the frequency instruction signal is not in a frequency interval corresponding to a conductive path in which any other battery that does not require an energy supplement is located.

Figure 6:
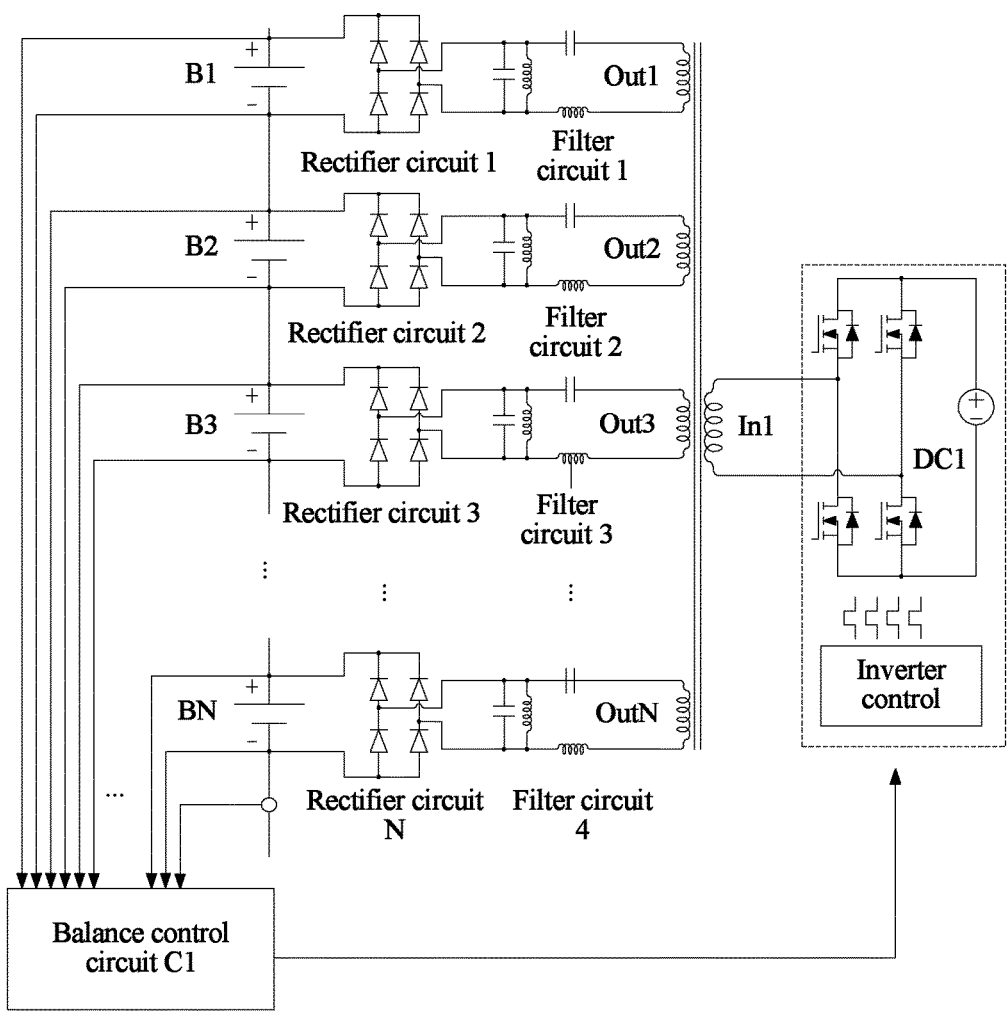
FIG. 6 shows a schematic diagram of an energy balancing apparatus according to another aspect of the present disclosure.

FIG. 6 shows an energy balancing apparatus provided by another aspect of the present disclosure. The battery energy balancing apparatus includes a controlled alternating current energy supply, an alternating current energy distribution circuit, filter circuits, rectifier circuits, and a balance control circuit.

The controlled alternating current energy supply is implemented by using a direct current energy supply, an inverter structure, and an inverter control circuit. A voltage output port of the controlled alternating current energy supply is connected to an input port In1 of the alternating current energy distribution circuit.

The alternating current energy distribution circuit is implemented by using a multi-winding transformer structure. The input port In1 and output ports Out1 to OutN are wound on a same magnetic core by means of magnetic coupling. Out1 to OutN correspond one-to-one to the filter circuits, and Out1 to OutN are connected to input sides of the corresponding filter circuits respectively.

The filter circuit is implemented by using a network obtained by connecting inductor and capacitor components in series or in parallel, and an output side of the filter circuit is connected to an alternating current side of the rectifier circuit.

The rectifier circuit is implemented by using a full-bridge rectifier composed of diodes, and the output side of the rectifier circuit is connected to a battery cell.

The balance control circuit is connected to the battery cell, and the balance control circuit is also connected to the controlled alternating current energy supply.

Figure 7:
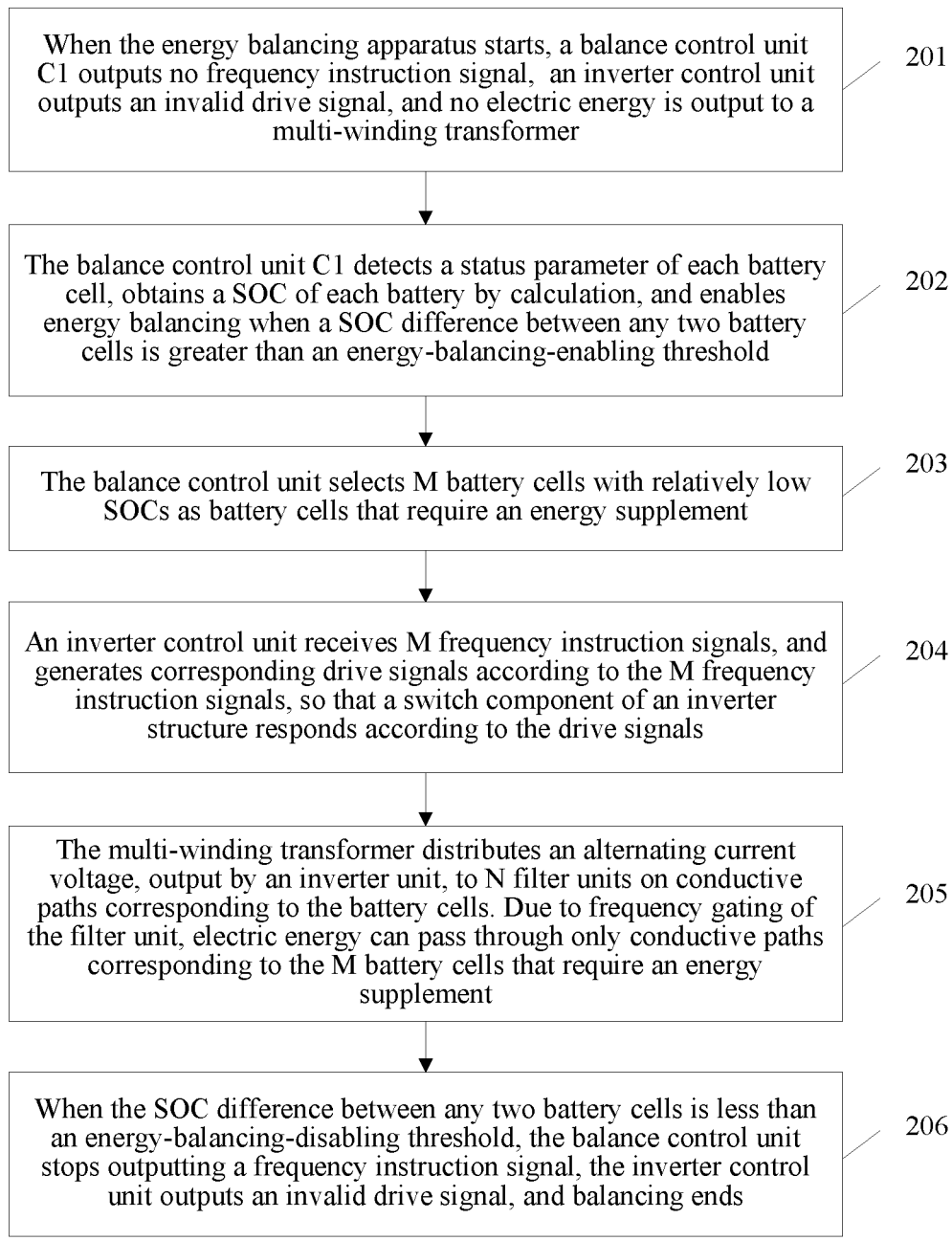
FIG. 7 shows a schematic flowchart of an energy balancing method according to another aspect of the present disclosure.

For the foregoing energy balancing apparatus shown in FIG. 6, as shown in FIG. 7, another aspect of the present disclosure provides an energy balancing method. The method is as follows:

201. When the energy balancing apparatus starts, a balance control circuit C1 outputs no frequency instruction signal, an inverter control circuit outputs an invalid drive signal, and no electric energy is output to a multi-winding transformer.

202. The balance control circuit C1 detects a status parameter of each battery cell, obtains a SOC of each battery cell by calculation, and enables energy balancing when a SOC difference between any two battery cells is greater than an energy-balancing-enabling threshold.

Figure 9:
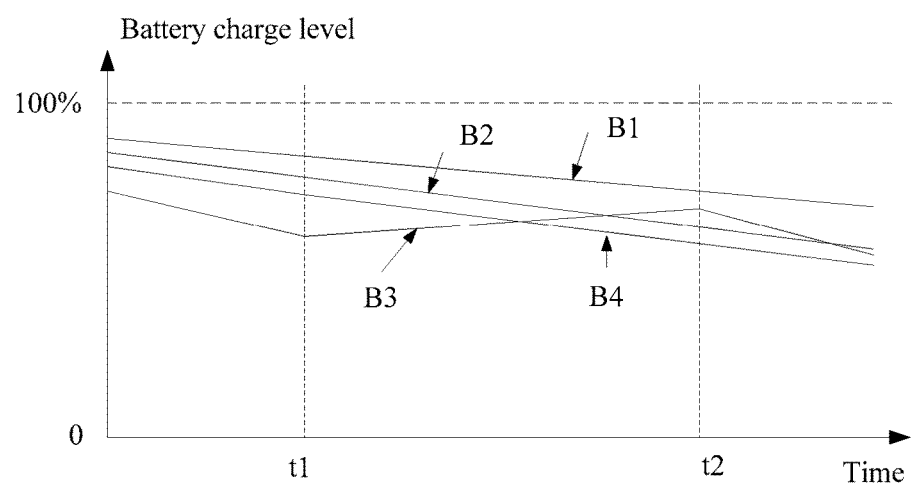
FIG. 9 shows a time-varying relationship between SOCs of battery cells according to another aspect of the present disclosure.

For example, FIG. 9 shows a schematic diagram of a time-varying relationship between SOCs of battery cells. The balance control circuit C1 collects in real time a working current in a series circuit of a battery pack and a terminal voltage of each battery cell. Before a time point t1, a SOC difference between battery cells is relatively small. At the time point t1, as energy loss of battery cells increases, a SOC difference between a battery cell B1 with high energy and a battery cell B3 with low energy is greater than the balance-enabling threshold (for example, 20%). The balance control circuit C1 enables an active balancing function.

203. The balance control circuit selects M battery cells with relatively low SOCs as battery cells that require an energy supplement, where M is an integer not less than 1.

M frequencies are selected as frequency instruction signals respectively from intervals of frequencies that are allowed to pass through conductive paths corresponding to the M battery cells. The M frequency instruction signals correspond one-to-one to the M battery cells that require an energy supplement. A conductive path corresponding to each battery cell has its own frequency interval, and a frequency instruction signal corresponding to the battery is only in the frequency interval of the conductive path corresponding to the battery.

The balance control circuit outputs the foregoing M frequency instruction signals to the inverter control circuit.

For example, as shown in FIG. 9, the balance control circuit selects B3 as a battery cell that requires an energy supplement, and outputs a corresponding frequency instruction to the inverter control circuit.

204. An inverter control circuit receives M frequency instruction signals, and generates corresponding drive signals according to the M frequency instruction signals, so that a switch component of an inverter structure responds according to the drive signals.

When M=1, the inverter structure outputs an alternating current voltage corresponding to a single frequency. When M>1, the inverter structure outputs a corresponding alternating current voltage obtained after multiple frequencies are modulated.

205. The multi-winding transformer distributes an alternating current voltage, output by the inverter structure, to N filter circuits on conductive paths corresponding to the battery cells. Due to frequency gating of the filter circuit, electric energy can pass through only conductive paths corresponding to the M battery cells that require an energy supplement. No electric energy or just very little electric energy passes through conductive paths corresponding to the other N-M battery cells.

The M battery cells that require an energy supplement receive electric energy.

For example, if M=1, it can be understood that one battery cell requires an energy supplement. A specific schematic diagram is shown in FIG. 9. The multi-winding transformer distributes the alternating current voltage to an input side of each filter circuit. Because each conductive path has a different frequency pass interval, alternating current energy passes through only a conductive path 3, so that an energy supplement is performed on the battery cell B3 with low energy. In this way, the SOC difference between B3 and B1 is reduced. At a time point t2, the SOC difference between the battery cell B3 and the battery cell B1 is less than a balance-disabling threshold (for example, 10%). In this case, the balance control circuit C1 disables the active balancing function, the full-bridge inverter structure stops outputting an alternating current voltag, and balancing for the battery cell B3 ends.

Figure 8:
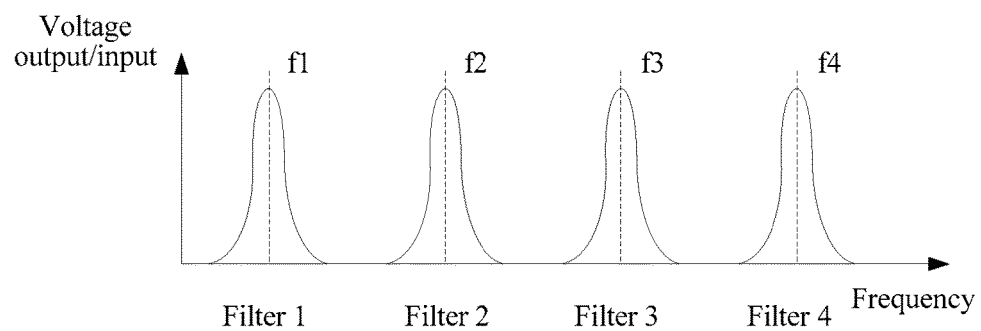
FIG. 8 shows filter circuits with different frequency pass intervals according to another aspect of the present disclosure.

For example, if N=4, it can be understood that the battery pack includes four battery cells. Filter circuits corresponding to conductive paths in which the four batteries are located have frequency pass intervals that are not overlapped with each other. A specific schematic diagram is shown in FIG. 8.

206. When the SOC difference between any two battery cells is less than an energy-balancing-disabling threshold, the balance control circuit stops outputting a frequency instruction signal, the inverter control circuit outputs an invalid drive signal, and balancing ends.

Figure 10:
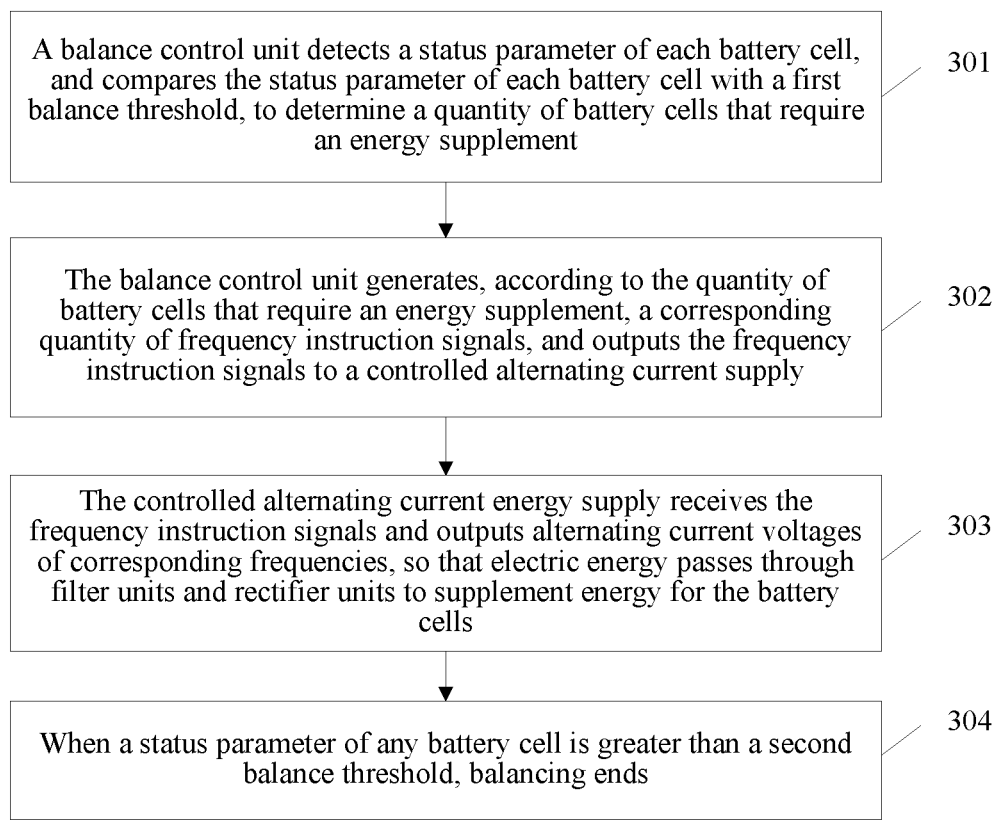
FIG. 10 shows a schematic diagram of an energy balancing method according to another aspect of the present disclosure.

Corresponding to the foregoing energy balancing apparatus shown in FIG. 6, as shown in FIG. 10, an energy balancing method is provided by another aspect of the present disclosure. The method is as follows:

301. A balance control circuit detects a status parameter of each battery cell, and compares the status parameter of each battery cell with a first balance threshold, to determine a quantity of battery cells that require an energy supplement.

The status parameter may be a voltage, a current, or a SOC obtained by calculation.

The first balance threshold may be an initial value set before an apparatus is delivered from a factory or an externally input value.

There may be one or more battery cells that require an energy supplement.

A battery cell that requires a supplement may be generated by the balance control circuit or an externally input value.

302. The balance control circuit generates, according to the quantity of battery cells that require an energy supplement, a corresponding quantity of frequency instruction signals, and outputs the frequency instruction signals to a controlled alternating current supply.

When only one battery cell, for example, Bx, requires an energy supplement, the balance control circuit C1 selects a value as a frequency instruction signal f_x from an interval of frequencies that are allowed to pass a conductive path corresponding to Bx. In addition, f_x meets the following requirement: f_x is not in an interval of frequencies that are allowed to pass a conductive path corresponding to any other battery cell that does not require an energy supplement.

When multiple battery cells, for example, Bi, Bj, and Bk, require an energy supplement, the balance control circuit C1 selects values as frequency instruction signals, for example, f_ref_i, f_ref_j, and f_ref_k separately from intervals of frequencies that are allowed to pass through conductive paths corresponding to Bi, Bj, and Bk. In addition, f_ref_i, f_ref_j, and f_ref_k meet the following requirement: f_ref_i, f_ref_j, and f_ref_k are not in an interval of frequencies that are allowed to pass a conductive path in which any other battery cell is located.

303. The controlled alternating current energy supply receives the frequency instruction signals and outputs alternating current voltages of corresponding frequencies, so that electric energy passes through filter circuits and rectifier circuits to supplement energy for the battery cells.

When only one frequency instruction signal is received, the controlled alternating current energy supply outputs an alternating current voltage with a fundamental wave frequency corresponding to the only one frequency instruction signal.

When multiple frequency instruction signals are received, the controlled alternating current energy supply outputs modulation alternating current voltages corresponding to the multiple frequency instruction signals.

304. When a status parameter of any battery cell is greater than a second balance threshold, balancing ends.

The status parameter may be a voltage, a current, or a SOC obtained by calculation.

The second balance threshold may be an initial value set before the apparatus is delivered from a factory or a value input by a user. The second balance threshold is greater than the first balance threshold.

With reference to the first aspect, in a first possible implementation manner of the first aspect, the controlled alternating current energy supply includes an inverter structure and an inverter control structure, and the inverter control structure is configured to receive the frequency instruction signal sent by the balance control circuit, and instruct the inverter structure to output an alternating current voltage whose frequency is corresponding to the frequency instruction signal.

With reference to the first aspect or the first possible implementation manner of the first aspect, in a second possible implementation manner of the first aspect, the N output ports of the alternating current energy distribution circuit are electrically isolated from each other.

With reference to the first aspect, the first possible implementation manner of the first aspect, or the second possible implementation manner of the first aspect, in a third possible implementation manner of the first aspect, the alternating current energy distribution circuit is a multi-winding transformer.

With reference to the first aspect, the first possible implementation manner of the first aspect, or the second possible implementation manner of the first aspect, in a fourth possible implementation manner of the first aspect, the alternating current energy distribution circuit is multiple double-winding transformers whose primary sides are connected in parallel and whose secondary sides are isolated from each other.

With reference to the first aspect, the first possible implementation manner of the first aspect, or the second possible implementation manner of the first aspect, in a fifth possible implementation manner of the first aspect, the alternating current energy distribution circuit is multiple coils.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the filter circuit is an active filter circuit or a passive filter circuit.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the filter circuit includes at least one inductor circuit and at least one capacitor circuit, where the inductor circuit and the capacitor circuit are connected in series or in parallel.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in an eighth possible implementation manner of the first aspect, the filter circuit includes at least one inductor circuit, at least one capacitor circuit, and at least one resistor circuit, where the inductor circuit, the capacitor circuit, and the resistor circuit are connected in series or in parallel.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the rectifier circuit is a full-bridge rectifier structure.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a tenth possible implementation manner of the first aspect, the rectifier circuit is a full-wave rectifier structure.

With reference to the third aspect, in a first possible implementation manner of the third aspect, the determining, according to the status parameter of each battery cell, a battery cell that requires an energy supplement includes:
   determining an energy level of each battery cell according to the status parameter of each battery cell; and
   determining a battery cell whose energy level is less than a first threshold as the battery cell that requires an energy supplement.

With reference to the first possible implementation manner of the third aspect, in a second possible implementation manner of the third aspect, after the alternating current voltage whose frequency is in the frequency interval is output, the method further includes:
   detecting an energy level of the battery cell that requires an energy supplement; and
   when the energy level of the battery cell that requires an energy supplement is greater than a second threshold, stopping supplementing energy, where the second threshold is greater than the first threshold.

With reference to the third aspect, in a third possible implementation manner of the third aspect, the determining, according to the status parameter of each battery cell, a battery cell that requires an energy supplement includes:
   determining an energy level of each battery cell according to the status parameter of each battery cell;
   obtaining an energy level difference between any two battery cells; and
   when an absolute value of the energy level difference is greater than a third threshold, determining a battery cell with a lower energy level in the any two battery cells as the battery cell that requires an energy supplement.

With reference to the third possible implementation manner of the third aspect, in a fourth possible implementation manner of the third aspect, after the alternating current voltage whose frequency is in the frequency interval is output, the method further includes:
   obtaining an energy level of the battery cell that requires an energy supplement; and
   when a difference between the energy level of the battery cell that requires an energy supplement and an energy level of a normal battery cell is less than or equal to a fourth threshold, stopping supplementing energy, where the normal battery cell is a battery cell that does not require an energy supplement, and the fourth threshold is less than the third threshold.

With reference to any one of the third aspect, or the first to the fourth possible implementation manners of the third aspect, in a fifth possible implementation manner of the third aspect, the outputting an alternating current voltage whose frequency is in the frequency interval includes:
   outputting a frequency instruction signal to a controlled alternating current energy supply, so that the controlled alternating current energy supply outputs an alternating current voltage corresponding to the frequency instruction signal, where the frequency instruction signal is in a frequency interval corresponding to a conductive path in which the battery cell that requires an energy supplement is located, and the frequency instruction signal is not in a frequency interval corresponding to a conductive path in which any other battery cell that does not require an energy supplement is located.

It can be learned from the above that, in the energy balancing method provided by the present disclosure, when multiple battery cells are balanced at the same time, amplitudes of fundamental wave voltages corresponding to frequencies in output modulation alternating current voltages may be adjusted separately to adjust amounts of energy received by different battery cells. Additionally or alternatively, a balance control circuit is allowed to select, according to a voltage magnitude or a SOC magnitude, a battery cell that requires an energy supplement.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

Content such as information exchange and an execution process between the modules in the apparatus and the system is based on a same idea as the method embodiments of the present disclosure. Therefore, for detailed content, refer to descriptions in the method embodiments of the present disclosure, and details are not described herein again.

Specific examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:
1. An energy balancing apparatus, comprising:
   a controlled alternating current energy supply, an alternating current energy distribution circuit, filter circuits, rectifier circuits, and a balance control circuit,
   wherein the alternating current energy distribution circuit comprises N output ports and at least one input port, N is an integer not less than 2, a quantity of the filter circuits is N, frequency intervals corresponding to any two filter circuits do not overlap, a quantity of the rectifier circuits is N, the output ports correspond one-to-one to the filter circuits, the filter circuits correspond one-to-one to the rectifier circuits, and the rectifier circuits correspond one-to-one to battery cells, a quantity of the battery cells is N; and
   wherein the controlled alternating current energy supply and the input port of the alternating current energy distribution circuit are connected in parallel, the controlled alternating current energy supply is connected to the balance control circuit, and the controlled alternating current energy supply is configured to output, according to a frequency instruction signal sent by the balance control circuit, an alternating current voltage corresponding to the frequency instruction signal;
   wherein each output port of the alternating current energy distribution circuit and an input side of a corresponding filter circuit are connected in parallel, and the alternating current energy distribution circuit is configured to distribute, to each output port, alternating current energy transferred from the controlled alternating current energy supply;
   wherein an output side of at least one filter circuit of the N filter circuits and an alternating current side of a corresponding rectifier circuit are connected in parallel, and at least one filter circuit is configured to allow alternating current energy whose frequency is in a preset frequency interval to pass; and wherein two ends of a direct current side of each rectifier circuit of the N rectifier circuits and two ends of a corresponding battery cell are connected in parallel, and the rectifier circuit is configured to convert, into direct current energy, the alternating current energy transferred from the filter circuit, and transfer the direct current energy to the battery cell.

2. The apparatus according to claim 1, wherein each battery cell is connected to the balance control circuit, the balance control circuit is configured to acquire a status parameter of each battery cell, determine, according to a status parameter of each battery cell, a battery cell that requires an energy supplement, determine a frequency interval of a filter circuit corresponding to the battery cell that requires an energy supplement, and send a frequency instruction signal to the controlled alternating current energy supply, so that the controlled alternating current energy supply outputs an alternating current voltage whose frequency is in the frequency interval.

3. The apparatus according to claim 1, wherein the controlled alternating current energy supply comprises an inverter structure and an inverter control structure, and the inverter control structure is configured to receive the frequency instruction signal sent by the balance control circuit, and instruct the inverter structure to output an alternating current voltage whose frequency is corresponding to the frequency instruction signal.

4. The apparatus according to claim 1, wherein the N output ports of the alternating current energy distribution circuit are electrically isolated from each other.

5. The apparatus according to claim 1, wherein the alternating current energy distribution circuit comprises a multi-winding transformer.

6. The apparatus according to claim 1, wherein the alternating current energy distribution circuit comprises multiple double-winding transformers whose primary sides are connected in parallel and whose secondary sides are isolated from each other.

7. The apparatus according to claim 1, wherein the alternating current energy distribution circuit is multiple coils.

8. The apparatus according to claim 1, wherein the filter circuit comprises an active filter circuit.

9. The apparatus according to claim 1, wherein the filter circuit comprises a passive filter circuit.

10. The apparatus according to claim 1, wherein the filter circuit comprises at least one inductor circuit and at least one capacitor circuit, wherein the inductor circuit and the capacitor circuit are connected in series or in parallel.

11. The apparatus according to claim 1, wherein the filter circuit comprises at least one inductor circuit, at least one capacitor circuit, and at least one resistor circuit, wherein the inductor circuit, the capacitor circuit, and the resistor circuit are connected in series or in parallel.

12. The apparatus according to claim 1, wherein the rectifier circuit comprises a full-bridge rectifier structure.

13. The apparatus according to claim 1, wherein the rectifier circuit comprises a full-wave rectifier structure.

14. A terminal comprising:

battery cells; and a controlled alternating current energy supply, an alternating current energy distribution circuit, filter circuits, rectifier circuits, and a balance control circuit, wherein the alternating current energy distribution circuit comprises N output ports and at least one input port, N is an integer not less than 2, a quantity of the filter circuits is N, frequency intervals corresponding to any two filter circuits do not overlap, a quantity of the rectifier circuits is N, the output ports correspond one-to-one to the filter circuits, the filter circuits correspond one-to-one to the rectifier circuits, and the rectifier circuits correspond one-to-one to the battery cells, a quantity of the battery cells is N; and wherein the controlled alternating current energy supply and the input port of the alternating current energy distribution circuit are connected in parallel, the controlled alternating current energy supply is connected to the balance control circuit, and the controlled alternating current energy supply is configured to output, according to a frequency instruction signal sent by the balance control circuit, an alternating current voltage corresponding to the frequency instruction signal;

wherein each output port of the alternating current energy distribution circuit and an input side of a corresponding filter circuit are connected in parallel, and the alternating current energy distribution circuit is configured to distribute, to each output port, alternating current energy transferred from the controlled alternating current energy supply;

wherein an output side of at least one filter circuit of the N filter circuits and an alternating current side of a corresponding rectifier circuit are connected in parallel, and at least one filter circuit is configured to allow alternating current energy whose frequency is in a preset frequency interval to pass; and wherein two ends of a direct current side of each rectifier circuit of the N rectifier circuits and two ends of a corresponding battery cell are connected in parallel, and the rectifier circuit is configured to convert, into direct current energy, the alternating current energy transferred from the filter circuit, and transfer the direct current energy to the battery cell.

* * * * *